United States Patent [19]

Honnold

[11] 4,100,971
[45] Jul. 18, 1978

[54] ROTARY HOE STRIPPING MEANS

[75] Inventor: Darrel Lee Honnold, Winterset, Iowa

[73] Assignee: Deere & Company, Moline, Ill.

[21] Appl. No.: 710,237

[22] Filed: Aug. 2, 1976

[51] Int. Cl.² ............................................. A01B 23/00
[52] U.S. Cl. ................................................... 172/547
[58] Field of Search ............... 172/561, 606, 607, 609, 172/546, 547; 403/129, 121; 301/41 R, 43; 280/158 R, 158 A

[56] References Cited

U.S. PATENT DOCUMENTS

| 198,163 | 12/1877 | Skillings | 172/547 |
| 1,219,793 | 3/1917 | Winner | 172/547 |

FOREIGN PATENT DOCUMENTS

| 880,963 | 6/1953 | Fed. Rep. of Germany | 172/547 |
| 667,904 | 3/1952 | United Kingdom | 173/547 |
| 312,920 | 10/1971 | U.S.S.R. | 172/547 |

Primary Examiner—Richard J. Johnson

[57] ABSTRACT

A pair of loosely coupled trash stripping rings are carried in face to face contact with sides of a rotary hoe wheel to continuously strip field trash accumulations from the hoe tines during cultivating operations. In operation, engagement with the ground continuously forces the stripping rings upwardly against the hoe hub and trash buildup on hoe tines opposite those tines engaging the ground is slidably scraped off by the upwardly moving stripping rings.

10 Claims, 5 Drawing Figures

ROTARY HOE STRIPPING MEANS

BACKGROUND OF THE INVENTION

The present invention relates to agricultural earthworking implements such as rotary hoes and more particularly, relates to an improved means for preventing trash from accumulating on hoe wheels during operation.

For many years earthworking implements utilizing tools such as rotary hoes have been used to cultivate and break up the soil crust close to young plants. To cultivate the fields after plowing or after planting, gangs of rotary hoes mounted on common shafts are often utilized.

Today as more farmers utilize chisel plowing rather than moldboard plowing, grass, plant roots and similar trash materials remain on the ground surface. Subsequently when the ground is cultivated with rotary hoes, the surface trash not turned under during chisel plowing is picked up on the wheel tines or wrapped around the hoe shaft.

To reduce trash buildup on rotary hoes and wheels, it has been common practice to position frame-mounted stripper fingers adjacent the rotary tine path whereat the trash can be stripped from the rotating tine members. While some of the trash buildup on the tines can be ripped off as the tines pass the stripper fingers, much of the trash pierced by the tines must be removed by pulling it from the tine. Further, a common type of trash buildup on rotary hoe gangs includes wrapping of grass and other similar materials about the hoe shaft. Stripper fingers will not minimize this type of trash buildup.

SUMMARY OF THE INVENTION

To overcome these problems applicant has provided a stripper means for continuously removing accumulations of trash from each hoe tine member and for preventing buildup of grassy-type trash on each hoe wheel shaft.

Accordingly, it is an object of the present invention to provide a stripper means for each hoe wheel which will remove trash accumulations continuously as they are encountered.

It is further an object to provide a stripping means which permits each rotary hoe wheel to operate independently of the adjacent rotary hoe wheel.

Another object includes the provision of a hoe wheel stripping means which will aid in preventing structural damage encountered by the hoe wheel as solid objects such as rocks and stumps are encountered during operation.

And finally it is an object to provide a simple and inexpensively manufactured and maintained stripper means which can be adapted to existing hoe wheels currently in operation.

DESCRIPTION OF THE PREFERRED EMBODIMENT

Figure 1:
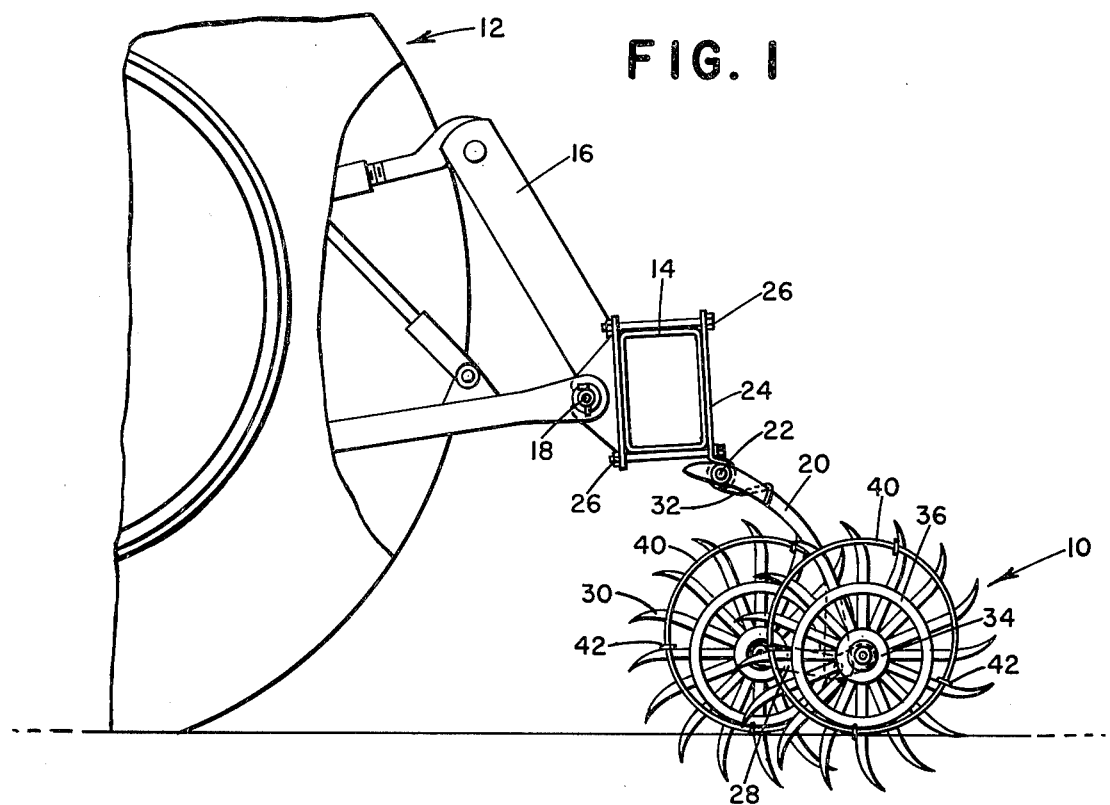
FIG. 1 is a side view of an implement utilizing rotary hoes and stripping means constructed in accordance with the principals of the present invention.
Figure 2:
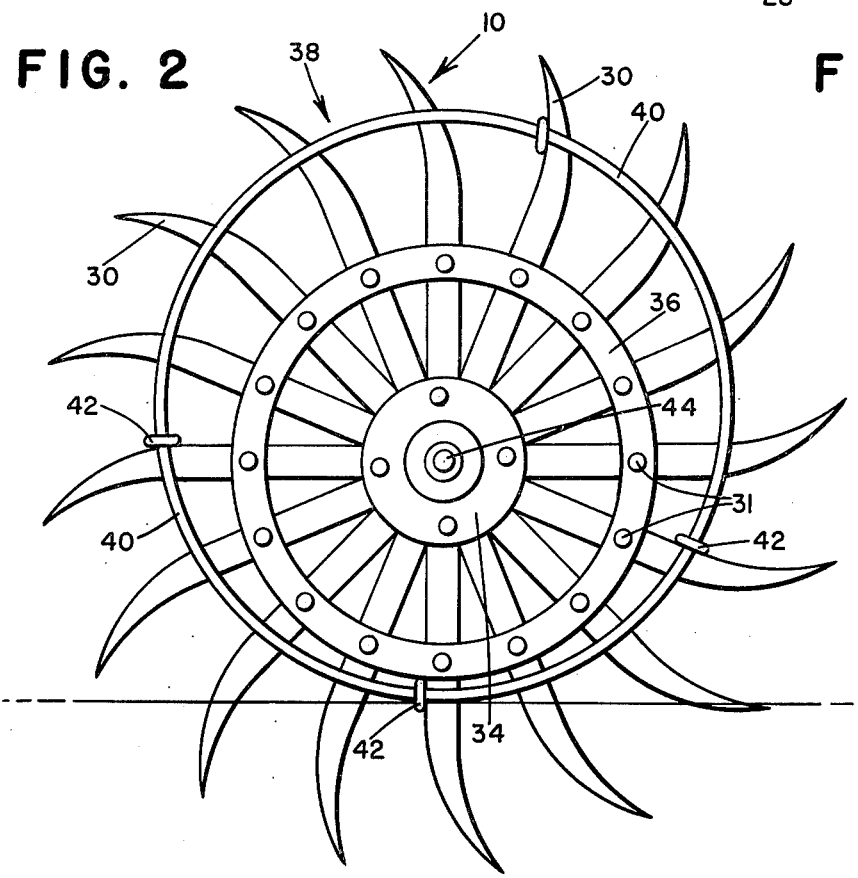
FIG. 2 is an expanded side view of the rotary hoe wheel illustrated in FIG. 1.
Figure 3:
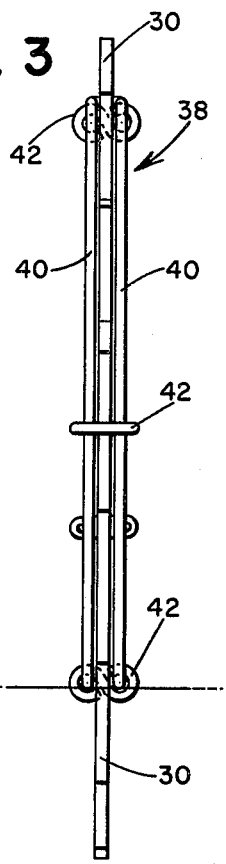
FIG. 3 is an end view of the rotary hoe illustrated in FIG. 2.

A rotary hoe constructed in accordance with the principals of the present invention is indicated generally in the drawings by the numeral 10 and is illustrated in FIG. 1 as being attached to a conventional tractor 12. The rotary hoe 10 is carried on an elongated toolbar 14 extending transversely to the normal direction of movement of the rotary hoe 10. An upstanding mast member 16 is secured to the center of the forward side of the toolbar 14 and is connected with the compression link 16 of the tractor three-point hitch. A pair of lower hitch pins 18 are carried by the forward side of the toolbar for connection with the lower draft links of the tractor three-point hitch.

A plurality of transversely spaced rearwardly extending support arms 20 have their forward ends pivotally connected with a pivot shaft 22 carried at the lower rearward corner of the toolbar 14. The support arms 20 are maintained in a spaced apart relationship by spacer bushings, not shown, positioned on the pivot shaft 22. The pivot shafts 22 are supported from the toolbar by mounting straps 24 secured to the toolbar by bolts 26.

The support arms 20 extend rearwardly and downwardly from the toolbar pivot shaft 22. The forward ends of the arms 20 extend slightly forward of the pivot shaft 22 and serve as stop means that abut against the lower side of the toolbar 14 to limit the downward movement of the lower ends of the arms.

A walker arm 28 is pivotally mounted at the lower end of each support arm 20 and a pair of front and rear rotary hoe wheels 10 are journaled on the ends of each walker arm 28. The rotary hoe wheels 10 are of well-known construction, each having a plurality of generally radially extending tines 30 with outer tips extending slightly forwardly with respect to the direction of rotation. The front and rear wheels 10 are mounted on opposite sides of the walker arms 28 so that the hoe wheels 10 are spaced apart laterally.

A downward force is applied on each support arm 20 by a helical torsion spring 32. Each biasing means or spring 32 is wrapped about a bushing adjacent the support arm 20 and has one free end in engagement with the toolbar 14 and the other free end bent to form a hook which engages the associated support arm 20.

Each rotary hoe wheel 10 is comprised of a central hub section 34 having a plurality of radially extending tine members 30 attached thereto. The tine members 30 of each wheel are secured in an equally angularly spaced relation to one another by being riveted, as at 31, to annular rib members 36 on opposite sides of the tines. The rib members 36 are concentric with and spaced radially outwardly with respect to the hub 34.

Tine stripping means 38 for each wheel 10 is comprised of two annular rings 40, each placed in substantially parallel vertical planar disposition. The rings 40 are positioned alongside and on opposite sides of respective hoe wheels 10 and are coupled together by S-shaped hooks 42 projecting between adjacent tine members 30. The stripper rings 40 are of a larger diameter than the annular rib member 36, but of smaller diameter than the rotary hoe wheel 10. The S-shaped hooks 42 secure the stripping rings 40 in place and couple the stripper rings 40 for rotation with their respective rotary hoe wheels 10. The S-shaped hooks 42 joining the stripper rings 40 are loosely connected thereto to permit relative movement of the rings 40 during operation.

During operation when the rotary hoe 10 is in a working position, the arrangement of the support arms 20 and biasing means 32 provide a substantially constant downward force on each pair of hoe wheels 10 for any given vertical position of the hoe wheels with respect to the toolbar. Thus, during use the reaction between the hoe wheels and the soil creates a force which tends to rock the walker arms 28 in a counterclockwise direction as viewed in FIG. 1. Consequently, the loosely fitting stripper rings 40 will ride over the surface of the soil being worked and the undersides thereof will be forced radially inwardly with respect to the tines 30 until the S-hook 42 contacts the rib member or abutment means 36 of the rotary hoe wheel 10. At the same time the upper sides of the rings 40 will be forced radially outwardly with respect to the tines 30. As the rotary hoe wheel 10 is advanced across the field, the stripper rings 40 will continue to be pressed against the rib member 36 at a point directly below the hoe shaft 44. As trash and dirt are accumulated on the tine members 30 during cultivating operation, the remainder and particularly the upper sides of the stripper rings 40 will slidably push the accumulation radially outwardly along that particular tine 30 as the wheel rotates to remove or strip the trash from the tine 30. The stripper rings 40 are connected by the S-shaped hooks 42 which extend between the adjacent tine members to assure rotation of the ring members 40 with the wheel 10. Because the rings 40 rotate with the wheel, the action of the ring relative to any particular tine as the wheel rotates is a reciprocable action along the radius of the tine thus stripping any material buildup radially outwardly along the tine to remove it therefrom during rotation.

Each rotary hoe wheel 10 is provided with its own stripper ring means 38 to assure that that wheel remains clean during operation. Each rotary hoe wheel is also mounted on its own shaft 44 rather than a common shaft for a gang of rotary hoe wheels to prevent buildup of grass and other long trash material on the common shaft.

Figure 4:
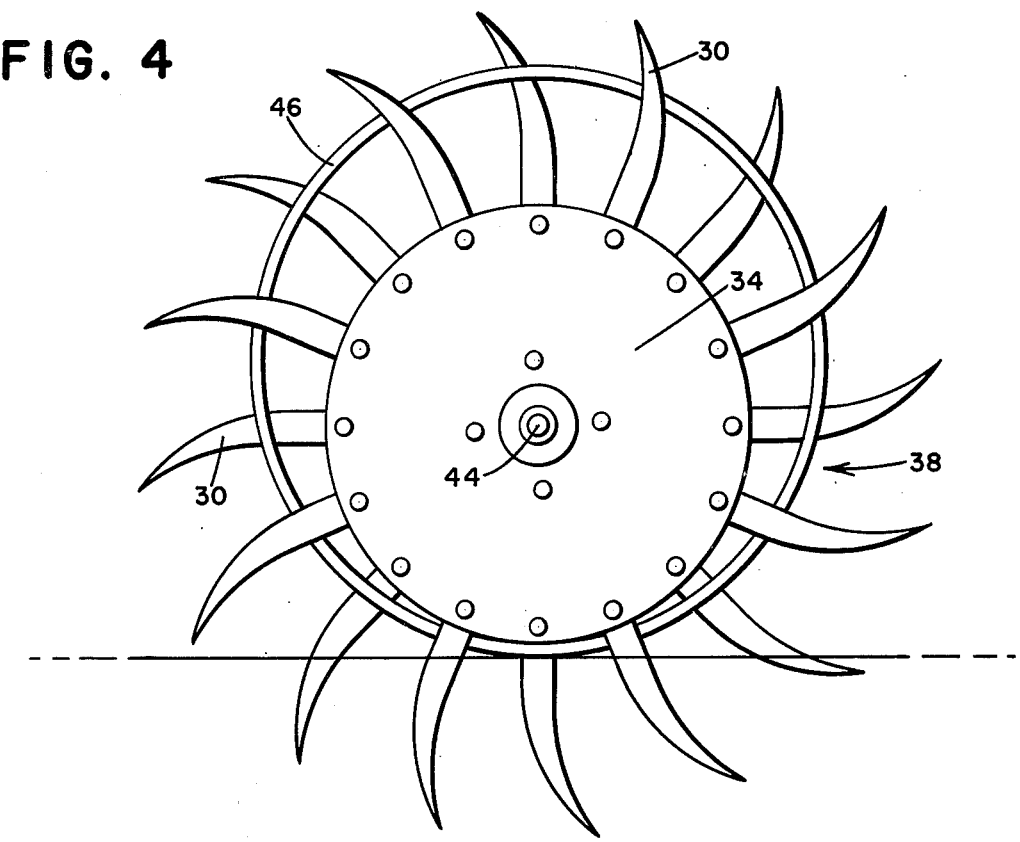
FIG. 4 is an expanded side view of an alternate embodiment utilizing the present invention.
Figure 5:
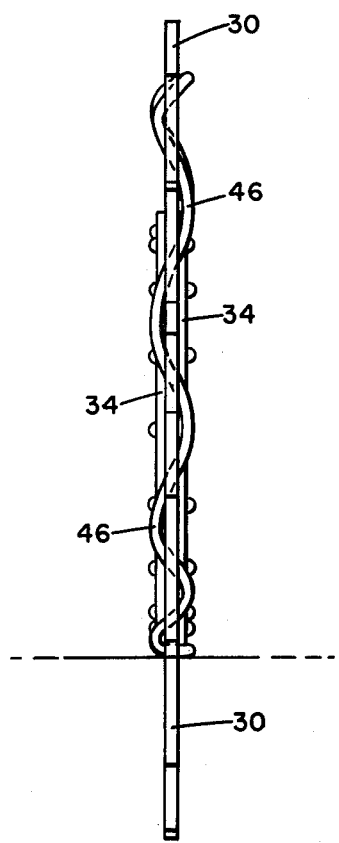
FIG. 5 is an end view of the hoe illustrated in FIG. 4.

An alternate embodiment is illustrated in FIGS. 4 and 5 wherein the hub 34 provides the abutment means or minimum radius to which the stripper rings can be moved and a single stripper ring is threaded behind alternate tine members. In this embodiment, the hub 34 serves to limit the movement of the stripping means 38 as the annular rib 36 does in the preferred embodiment illustrated in FIG. 1. A single stripping ring 46 is utilized in this alternate embodiment and operates as does the preferred pair of rings 40 shown in FIG. 1. The single ring 46 is woven between tine members 30 as illustrated in the end view of FIG. 5 and will slide but will not rotate relative to the hoe wheel 10 as will the preferred embodiment. Since the stripper rings 40 or 46 during operation of the rotary hoe wheel provide to some degree a limitation upon the penetration of the rotary hoe tines, the radius of the rib member 36 or hub member 34 as illustrated in FIG. 4 will define the amount of tine penetration possible. Should the operator prefer to limit the penetration of the tine members 30, flat ring members could be substituted for the bar-type ring members 40 illustrated in the drawings of the preferred embodiment.

From the foregoing, it can be seen that the present invention provides a rotary hoe wheel and stripper means which can be satisfactorily used in extremely trashy or normal field conditions.

I claim:

1. A rotary hoe wheel of the type having a central hub member and a plurality of radially extending tine members secured to the hub, the improvement residing in a tine cleaning means comprising: a separate ring member closely adjacent each side of the wheel, the diameter of said ring members being equal to or less than the wheel; and means loosely coupling the ring members together for limited movement relative to one another, for rotation with the wheel and for radial sliding movement along the tine members in substantial unison.

2. The invention defined in claim 1 wherein the means loosely coupling the ring members together is a plurality of S-shaped hooks.

3. The invention defined in claim 1 wherein the hoe wheel is further characterized by the provision of an annular rib member securing the tine members in place, said rib member having a diameter in excess of that of the hub, but smaller than that of the ring member.

4. A rotary hoe wheel as set forth in claim 1, and wherein the means coupling the ring members further includes an abutment surface engageable with the hub member to limit radial movement of the ring member.

5. A rotary hoe wheel comprising: a central hub member; a plurality of radially extending tine members secured to the hub; a separate ring member disposed closely adjacent each side of the wheel and having a diameter equal to or less than the wheel; and means loosely coupling the ring members together for limited relative movement, for rotation with the wheel and for radial sliding movement along the tine members in substantial unison, said means including an abutment surface extending between adjacent tine members are engageable with the tine members to limit rotational movement of the ring members relative to the wheel.

6. The invention defined in claim 5 wherein the coupling means includes a plurality of S-shaped hooks connected with each ring and extending between adjacent tine members.

7. A rotary hoe wheel comprising: a central hub; a plurality of radially extending tine members secured to the hub; and a tine cleaning means including a pair of annular ring members having a diameter equal to or smaller than the wheel, said ring members disposed closely adjacent opposite sides of the tine members; and means loosely coupling said ring members together for limited movement relative to one another, for rotational movement with the wheel and for radial sliding movement along the tine members in substantial unison, said means further including an abutment surface disposed between adjacent tine members and engageable with the tine members and hub to limit radial and rotational movement of the ring members relative to the wheel.

8. The invention defined in claim 7 wherein the means coupling the ring members is a plurality of S-shaped hooks connected with each ring member and disposed between adjacent tine members.

9. A rotary hoe wheel having a central hub; a plurality of radially extending tine members angularly spaced about and attached to said hub; and an improved tine cleaning means including a pair of annular ring members having a diameter equal to or smaller than the wheel, one ring member disposed closely adjacent each side of the tine members, and a plurality of hooks loosely coupling the ring members together for limited relative movement, said hooks disposed between adjacent tine members to permit radial sliding movement of the ring members along the tine members in substantial unison and rotatively couple said ring members with the wheel.

10. The invention defined in claim 9 wherein the means loosely coupling the ring members together is a plurality of S-shaped hooks.

* * * * *